(12) United States Patent
Wood

(10) Patent No.: US 6,882,824 B2
(45) Date of Patent: Apr. 19, 2005

(54) INTERACTIVE TEACHING TOY

(75) Inventor: Michael C. Wood, Orinda, CA (US)

(73) Assignee: LeapFrog Enterprises, Inc., Emeryville, CA (US)

(*) Notice: Subject to any disclaimer, the term of this patent is extended or adjusted under 35 U.S.C. 154(b) by 53 days.

(21) Appl. No.: 10/230,956

(22) Filed: Aug. 28, 2002

(65) Prior Publication Data

US 2003/0059757 A1 Mar. 27, 2003

Related U.S. Application Data

(63) Continuation-in-part of application No. 09/632,424, filed on Aug. 4, 2000, now Pat. No. 6,801,751, which is a continuation of application No. 09/384,657, filed on Aug. 7, 1999, now Pat. No. 6,463,257, which is a continuation of application No. 09/095,492, filed on Jun. 10, 1998, now Pat. No. 5,944,533.
(60) Provisional application No. 60/181,967, filed on Feb. 10, 2000, and provisional application No. 60/168,214, filed on Nov. 30, 1999.

(51) Int. Cl.$^7$ ............................. G09B 5/00; A63H 3/28
(52) U.S. Cl. ...................... 434/308; 434/335; 446/297; 446/318
(58) Field of Search ................................ 434/308, 322, 434/335, 169, 327, 393; 446/143, 268, 297, 302, 369, 368, 397

(56) References Cited

U.S. PATENT DOCUMENTS

| | | |
|---|---|---|
| 2,826,828 A | 3/1958 | Hamilton |
| 2,921,385 A | 1/1960 | Hamilton |
| 3,052,041 A | 9/1962 | Luxton et al. |
| 3,371,321 A | 2/1968 | Adams |
| 3,660,913 A | 5/1972 | Heath |
| 3,977,292 A * | 8/1976 | Favilli et al. .............. 84/470 R |
| 4,679,789 A | 7/1987 | Okada |
| 4,690,645 A | 9/1987 | Ukisu |
| 4,846,693 A * | 7/1989 | Baer .......................... 434/308 |
| 5,018,082 A | 5/1991 | Obata et al. |

(Continued)

FOREIGN PATENT DOCUMENTS

| | | |
|---|---|---|
| JP | 59-44078 A | 3/1984 |
| JP | 61-252575 A | 11/1986 |

OTHER PUBLICATIONS

"Classic Toys 2001: VTech Industries, Little Smart Tiny Touch Phone", <http://www.drtoy.org/drtoy/vtech.sub.–tinytouch.sub.–2001c.htm>, 1990.

(Continued)

*Primary Examiner*—Kurt Fernstrom
(74) *Attorney, Agent, or Firm*—Townsend and Townsend and Crew LLP (57) ABSTRACT

Embodiments of the invention are directed to educational toys. In one embodiment, the educational toy includes (a) a figure having an exterior surface, and wherein the figure has a chest, hands and feet, (b) at least one indicium on the chest of the figure, (c) switching circuitry coupled to the indicia, (d) a sound synthesizer, (e) a speaker, (f) a memory, (g) a plurality of preprogrammed instruction modalities in the memory, wherein the plurality of preprogrammed instruction modalities comprises a first preprogrammed instruction modality and a second preprogrammed instruction modality, and (h) a logic circuit having a microprocessor, input terminals that are electrically coupled to the switching circuitry, and output terminals electrically coupled to the sound synthesizer and the speaker. The logic circuit controls the interaction between the switching circuitry and the plurality of preprogrammed instruction modalities.

35 Claims, 8 Drawing Sheets

U.S. PATENT DOCUMENTS

| | | | |
|---|---|---|---|
| 5,114,376 | A | 5/1992 | Copley et al. |
| 5,122,952 | A | 6/1992 | Minkus |
| 5,188,533 | A | 2/1993 | Wood |
| 5,204,968 | A | 4/1993 | Parthasarathi |
| 5,261,823 | A | 11/1993 | Kurokawa |
| 5,267,865 | A | 12/1993 | Lee et al. |
| 5,302,132 | A | 4/1994 | Corder |
| RE34,728 | E | 9/1994 | Hall-Tipping |
| 5,377,100 | A | 12/1994 | Pope et al. |
| 5,387,104 | A | 2/1995 | Corder |
| 5,413,355 | A | 5/1995 | Gonzalez |
| 5,513,308 | A | 4/1996 | Mori |
| 5,535,321 | A | 7/1996 | Massaro et al. |
| 5,562,453 | A | 10/1996 | Wen |
| 5,597,312 | A | 1/1997 | Bloom et al. |
| 5,681,170 | A | 10/1997 | Rieber et al. |
| 5,683,082 | A | 11/1997 | Takemoto et al. |
| 5,727,950 | A | 3/1998 | Cook et al. |
| 5,727,951 | A | 3/1998 | Ho et al. |
| 5,746,602 | A | 5/1998 | Kikinis |
| 5,774,118 | A | 6/1998 | Hatakama |
| 5,779,486 | A | 7/1998 | Ho et al. |
| 5,788,508 | A | 8/1998 | Lee et al. |
| 5,820,386 | A | 10/1998 | Sheppard, II |
| 5,823,781 | A | 10/1998 | Hitchcock et al. |
| RE36,028 | E | 1/1999 | Deesen et al. |
| 5,855,483 | A | 1/1999 | Collins et al. |
| 5,879,163 | A | 3/1999 | Brown et al. |
| 5,902,116 | A | 5/1999 | Rieber et al. |
| 5,904,485 | A | 5/1999 | Siefert |
| 5,910,009 | A | 6/1999 | Leff et al. |
| 5,944,533 | A | 8/1999 | Wood |
| 5,957,699 | A | 9/1999 | Peterson et al. |
| 5,967,793 | A | 10/1999 | Ho et al. |
| 5,971,850 | A | 10/1999 | Liverance |
| 5,971,855 | A | 10/1999 | Ng |
| 6,010,339 | A | 1/2000 | McDonald |
| 6,012,961 | A | 1/2000 | Sharpe, III et al. |
| 6,021,306 | A | * 2/2000 | McTaggart .................. 434/317 |
| 6,029,042 | A | 2/2000 | Yaron-Moallim |
| 6,036,496 | A | 3/2000 | Miller et al. |
| 6,039,575 | A | 3/2000 | L'Allier et al. |
| 6,064,856 | A | 5/2000 | Lee et al. |
| 6,074,212 | A | * 6/2000 | Cogliano .................... 434/159 |
| 6,142,784 | A | 11/2000 | Wood |
| 6,149,441 | A | 11/2000 | Pellegrino et al. |
| 6,159,101 | A | * 12/2000 | Simpson ...................... 463/46 |
| 6,164,975 | A | 12/2000 | Weingarden et al. |
| 6,179,682 | B1 | 1/2001 | Plain et al. |
| 6,190,178 | B1 | 2/2001 | Oh |
| 6,211,451 | B1 | 4/2001 | Tohgi et al. |
| 6,290,504 | B1 | 9/2001 | Benitz et al. |
| 6,290,566 | B1 | 9/2001 | Gabai et al. |
| 6,299,452 | B1 | 10/2001 | Wasowicz et al. |
| 6,301,462 | B1 | 10/2001 | Freeman et al. |
| 6,317,714 | B1 | * 11/2001 | Del Castillo et al. ....... 704/270 |
| 6,319,010 | B1 | * 11/2001 | Kikinis ...................... 434/169 |
| 6,328,569 | B1 | 12/2001 | Jenkins et al. |
| 6,330,426 | B1 | 12/2001 | Brown et al. |
| 6,443,796 | B1 | * 9/2002 | Shackelford ................. 446/91 |
| 6,572,431 | B1 | * 6/2003 | Maa .......................... 446/301 |

OTHER PUBLICATIONS

LeapFrog "Create–a–Word SuperMat" and "Create–a–Word Traveler" Manual, 2 pages, 1997.

PenMaster Handwriting Recognition System, 2 pgs.

VTech "Little Smart Number Desk" Manual, 6 pages (no date printed).

VTech Fun to Talk Phone Manual, 5 pages, 1993.

VTech Little Smart Dial A Smile Manual, 6 pages, 1993.

VTech Smart Play, "Little Smart Alphabet Desk", 3 pages, 1992.

VTech Smart Play, "Little Smart Number Desk", 4 pages, 1995.

VTech Smart Play, "Video Painter", 3 pages, 1993.

* cited by examiner

FIG. 5

INTERACTIVE TEACHING TOY

CROSS REFERENCE TO RELATED APPLICATIONS

This patent application is a continuation-in-part application of U.S. patent application Ser. No. 09/384,657, filed on Aug. 27, 1999, and is now U.S. Pat. No. 6,463,257, which is a continuation-in-part of U.S. patent application Ser. No. 09/095,492, which was filed on Jun. 10, 1998, and is now U.S. Pat. No. 5,944,533. This patent application is also a continuation-in-part application of U.S. patent application Ser. No. 09/632,424, filed Aug. 4, 2000 now U.S. Pat. No. 6,801,751. This application and U.S. patent application Ser. No. 09/632,424 claim the benefit of the filing date of U.S. Provisional patent application Ser. No. 60/181,967, filed Feb. 10, 2000, and U.S. Provisional Application Ser. No. 60/168,214, filed Nov. 30, 1999. All of the patents and patent applications mentioned above and below are herein incorporated by reference in their entirety for all purposes.

BACKGROUND OF THE INVENTION

There are a number of educational toys that attempt to engage a child's interest and to teach the child any of a variety of concepts by virtue of the child's play with the toy. These toys, however, are geared to single format learning. Typically, toys implement a particular instructional modality and use it exclusively.

For example, in U.S. Pat. No. 5,376,038, issued to Avi Arad, a doll is disclosed that has electronic switches located in the hands, feet, nose, lips, and other body parts of the doll. When a child presses the switch, for example, in the hand, the doll says the word "hand". An adult can adjust a programming switch that changes the complexity of speech so that the doll appears to say the words "hold my hand" instead of saying the word "hand". Arad's doll, however, not only requires the intervention of an adult for full operation, it only says a word or phrase in response to activation of a switch in a particular body part. Arad's doll provides the user with only a single instruction modality wherein a name is provided for a body part.

A toy that is available on the market, entitled "What Am I?", a Golden Book™ product (Western Publishing Co. Inc.; 1220 Mound Ave.; Racine, Wis. 53404), presents a slightly different format. It presents the child with a 6×6 array of cartoon representations of unrelated objects. The objects might be, for example, a bus, a bird, a spoon, a cake, a roller skate, etc. The child is asked to guess what object is in the "mind" of the toy, with the voice synthesized question, "What am I?" Upon pressing an image, the child is told "I am bigger than that," "I am smaller than that," or "I am a different color," etc. When playing with the toy, it often takes users, including adults, many tries to get a correct answer, causing frustration. Also, the child must have a very clear idea of what the object is before playing the game because the object representations are all the same size. For example, in the toy, a house, a spoon, a cat, and an apple are all represented with the same size picture. As with the other toys, the format is invariable. Only one instruction modality is presented. Additionally, there are a small number of phrases and tunes in the toy.

Embodiments of the invention address these and other problems, individually and collectively.

SUMMARY OF THE INVENTION

Embodiments of the invention are directed to educational toys and systems using educational toys.

One embodiment of the invention is directed to an educational toy comprising: (a) a figure having an exterior surface, and wherein the figure has a head and a chest; (b) at least one indicium on the chest of the figure; (c) switching circuitry coupled to the indicia; (d) a sound synthesizer; (e) a speaker; (f) a memory; (g) a plurality of preprogrammed instruction modalities in the memory, wherein the plurality of preprogrammed instruction modalities comprises a first preprogrammed instruction modality and a second preprogrammed instruction modality; and (h) a logic circuit having a microprocessor, input terminals that are electrically coupled to the switching circuitry, and output terminals electrically coupled to the sound synthesizer and the speaker, wherein the logic circuit controls interaction between the switching circuitry and the plurality of preprogrammed instruction modalities.

Another embodiment of the invention is directed to a system comprising: (a) an educational toy comprising i) a figure having an exterior surface, and wherein the figure is an animal having a chest, hands and feet, ii) indicia on the chest of the figure, iii) switching circuitry coupled to the indicia, iv) a sound synthesizer, v) a speaker, vi) a memory, vii) a plurality of preprogrammed instruction modalities in the memory, wherein the plurality of preprogrammed instruction modalities comprises a first preprogrammed instruction modality and a second preprogrammed instruction modality, viii) a logic circuit having a microprocessor, input terminals that are electrically coupled to the switching circuitry, and output terminals electrically coupled to the sound synthesizer and the speaker, wherein the logic circuit controls interaction between the switching circuitry and the plurality of preprogrammed instruction modalities, and ix) a recess; and (b) a transferable information storage medium that is insertable in the recess.

Another embodiment of the invention is directed to a system comprising: (a) an educational toy comprising i) a figure having an exterior surface, ii) indicia on the exterior surface of the figure, iii) switching circuitry coupled to the indicia, iv) a sound synthesizer, v) a speaker, vi) a memory, vii) a plurality of preprogrammed instruction modalities in the memory, wherein the plurality of preprogrammed instruction modalities comprises a first preprogrammed instruction modality and a second preprogrammed instruction modality, and viii) a logic circuit having a microprocessor, input terminals that are electrically coupled to the switching circuitry, and output terminals electrically coupled to the sound synthesizer and the speaker, wherein the logic circuit controls interaction between the switching circuitry and the plurality of preprogrammed instruction modalities; and (b) an information storage medium containing code for changing outputs provided by the toy, wherein the code is received from a server computer via the Internet.

These and other embodiments are described in further detail below.

DETAILED DESCRIPTION

Learning is best achieved when at least three physical modalities are logically connected and engaged: audio, visual, and kinesthetic. Instruction is best reinforced when both recognition and recall memory are engaged.

An education toy ideally provides an inviting format for interaction and combines instruction with quizzing and logic to engage all aspects of a child's interactive capability. For a toddler, the educational toy ideally combines instruction with kinesthetic and hand-eye coordination skills while using reinforcing auditory responses. Accordingly, in some embodiments of the invention, declaratory instruction, rhythmic songs, direct simple quizzing and/or rewards for successful hand-eye coordination can be combined in any suitable fashion in a toy to enhance learning.

Embodiments of the invention provide a teaching toy that invites a child's interaction using more than one instructional modality in a mixed format presentation. The toy may provide declarative instruction, improve hand-eye coordination, and/or induce auditory and visual connections in the child's mind via positive reinforcement through songs and/or visual stimuli. Embodiments of the present invention can teach and reinforce a child's knowledge of geometric shapes, colors, song, letters, numbers, words, phonics, reading, and/or social skills using mixed instruction modalities. A child can also improve kinesthetic skills using embodiments of the invention.

The users of embodiments of the invention may be children. For example, the users may be toddlers of the age between about 5 months and about 48 months, or more preferably between about 9 months and about 24 months. Older children may also use embodiments of the invention.

One embodiment of the invention is directed to an educational toy that teaches children symbols and name association concepts. In this embodiment, the name, meaning, and/or characteristic of a symbol are taught. The educational toy teaches these principles using auditory, visual, and kinesthetic cues, and by engaging the child in recognition tasks. While performing one task (e.g., playing a game that targets one learning skill), other learning skills are reinforced.

To engage the child, the educational toy can be embodied in a figure that appeals to a child. The figure may be a plush figure that invites touching and feeling, or a figure that holds other interest for the child. Examples of plush figures include those in the shapes of household pets, cartoon figures, human figures, or hybrid fantasy designs. Examples of other figures that may hold a child's interest include household articles like a telephone.

Indicia can be positioned on the figure so that they are easy for a child to grasp, squeeze, or push. Examples of indicia include numbers, letters, shapes, symbols, etc. For example, an array of indicia comprising geometric shapes may be on a bib that is on the chest of the figure. Indicia comprising colors may also be attached to the figure's bib or fingers. One or more indicia associated with an On/Off switch or a song switch may be on the figure's palms, feet, or at other suitable location on the figure.

Additionally, indicia that can be selected to cause the educational toy to initiate different learning or play modes. The indicia could be located in an easy to reach place. For example, the indicia could be on the chest of the figure. In other embodiments, the indicia may be alternatively or additionally placed on the feet, legs, arms, or hands, etc. of the figure.

Embodiments of the invention may have any suitable number of preprogrammed instruction modalities that are preprogrammed into a memory. The memory may be internal and may comprise, for example, one or more memory chips.

In some embodiments, a declaratory instruction modality may be preprogrammed into a memory in the educational toy. A declaratory instruction modality is useful in teaching young children the names of indicia such as the names of shapes and colors. For example, in embodiments of the invention, a child can press a shape on the toy to hear its name. The child can also press a color spot and hears its name.

Another preprogrammed instruction modality may teach a child kinesthetics. For example, to teach kinesthetic ability, a light can be located on, at, or shine adjacent to any of several shapes, color spots, or shapes having specific colors. The lights may flash so that a single light appears to move from shape to shape. A light may appear to move, for example, from a triangle to a square, and then on to a circle. If a toddler pushes the shape that has the light, he or she gets rewarded with a song. The toddler thus learns to connect what her or his eyes are seeing with a motor function skill, such as pushing the lighted object. The toddler further learns to control the playing of one or more songs by pushing the shape with a light on it. The ability to control the toy keeps the toddler's attention and reinforces the new learning.

Yet another preprogrammed instruction modality may teach music. For example, a note symbol may be on the figure. A child may learn about music by pressing the note symbol. Advantageously, a child can associate the pressing of the note symbol to the songs that are played by the educational toy.

In embodiments of the invention, a child perceives embodiments of the invention as toys, independently of their teaching function. Embodiments of the invention can combine the above-described instruction modalities and other instruction modalities to teach children. For example, embodiments of the invention can teach the concept that a shape can be described (or named) by both its geometry and by its color. Further, by using songs, embodiments of the invention reinforce the child's kinesthetic ability and teach that songs are represented by a "note" symbol. Perceptual skills are stimulated by bright colors, flashing lights, and a reward for the child connecting the flashing light with the object the child squeezes. A child's cognitive skills and memory are developed through musical rhythms and melodies. Reasoning skills are initiated through interactive play that helps children connect action with reaction, symbols with sounds, and words with meaning. Furthermore, children develop fine motor skills using embodiments of the invention.

Figure 1:
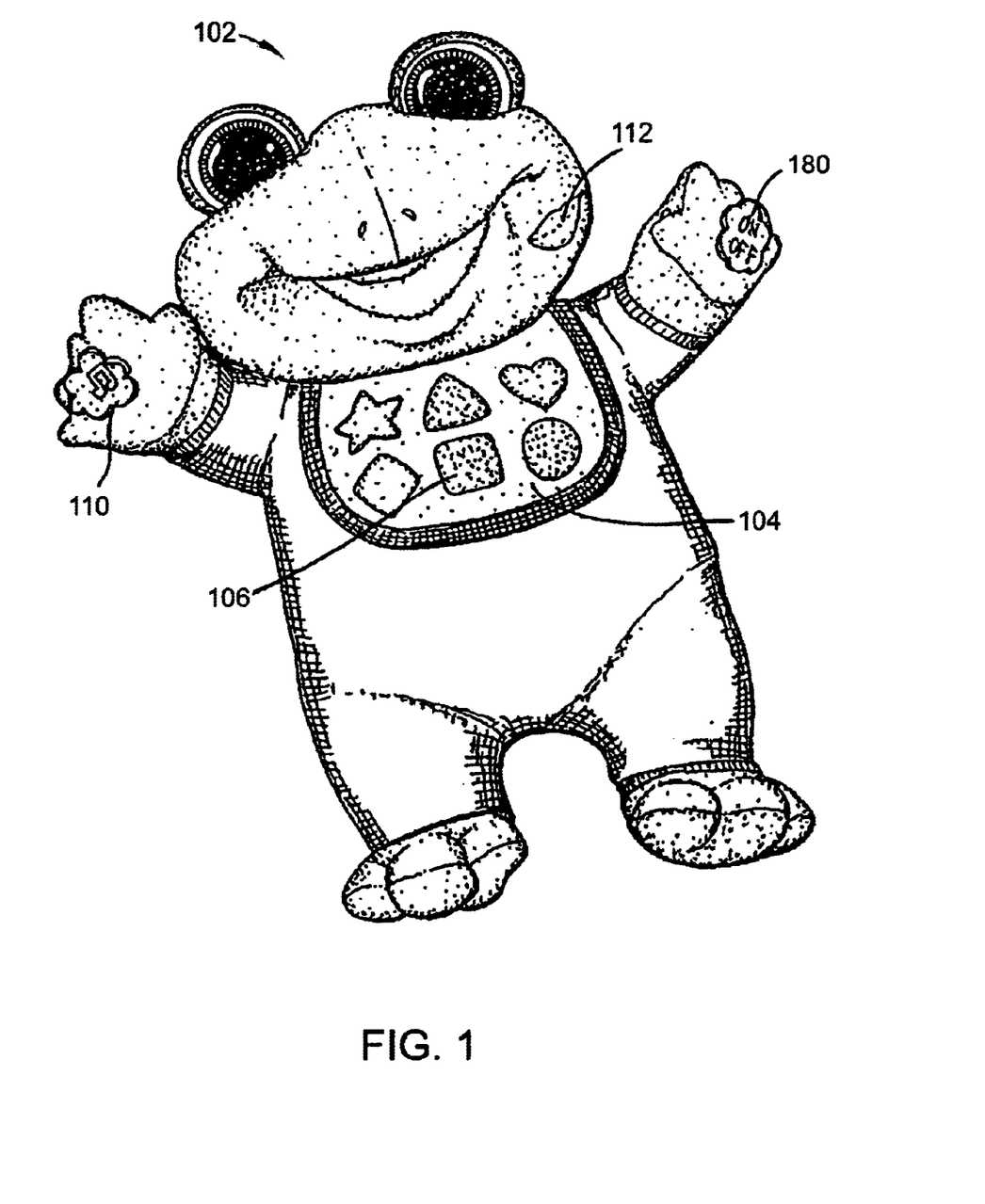
FIG. 1 shows a toy in the form of a plush animal with indicia on its chest and hands.

FIG. 1 shows an educational toy according to an embodiment of the invention. The toy includes a figure in the form of a plush baby frog 102. In one embodiment, the frog is sized about one foot high and about one foot wide. The frog may be called Baby Tad after the fact that a tadpole is a juvenile form of a frog. The frog may be made from a soft colorful fabric that is pleasant to touch, and has a cuddly appearance.

The frog 102 has a bib 104 that contains a 2×3 matrix including six shapes 106. Each shape is a solid color. In this embodiment six different shapes with six different colors are present. Preferably, at least 3 different colors are present in the plurality of indicia. Each shape has a light (not shown) associated with it. At any one time, a light will shine from only one shape. One of the frog's palms has an On/Off function indicium 108 on it. The toy also has timer so that if it is not played for 20 seconds continuously, the toy says, "Bye Bye" and turns off. A musical indicium 110, for example a musical note, is located on the other palm.

Figure 2A:
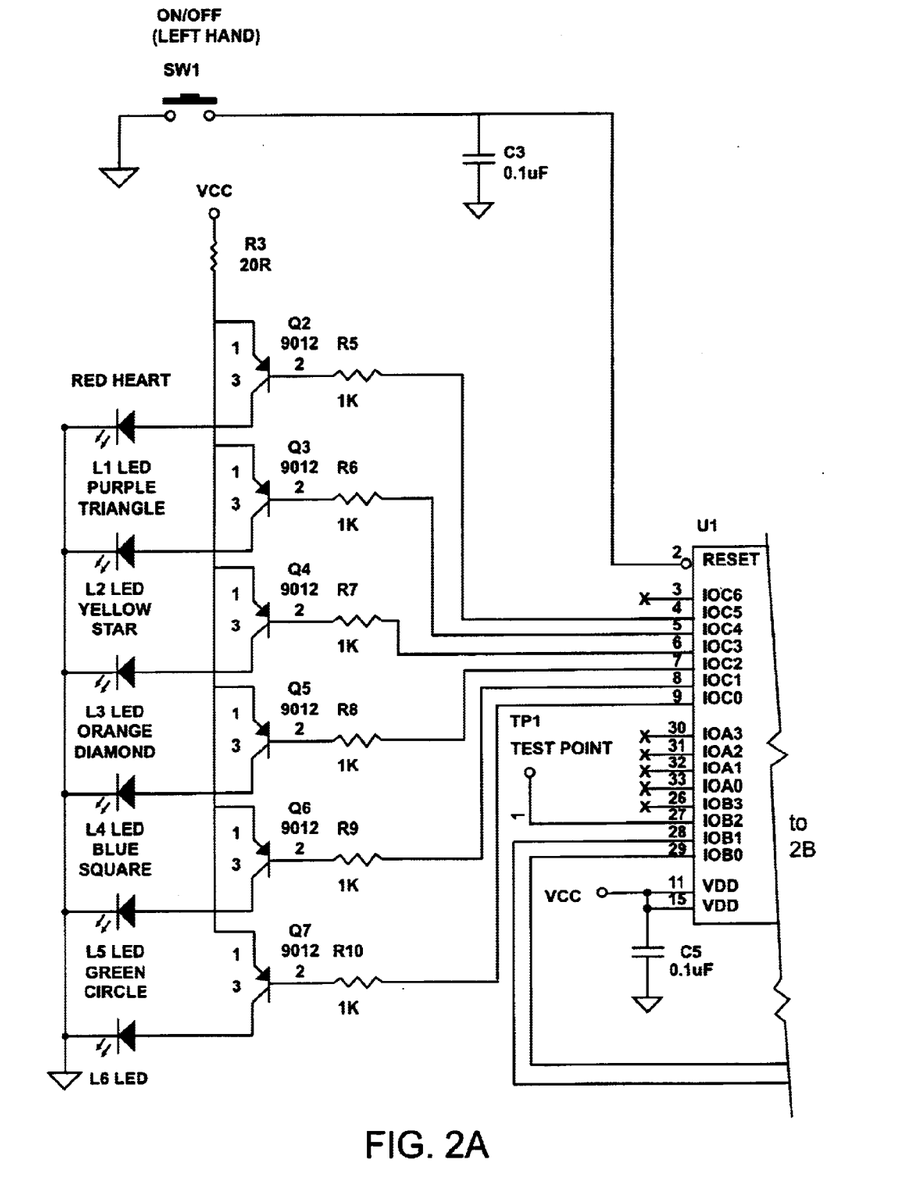
FIG. 2 is a schematic diagram of one embodiment of switch and logic circuitry that controls a plurality of preprogrammed instruction modalities.
Figure 2B:
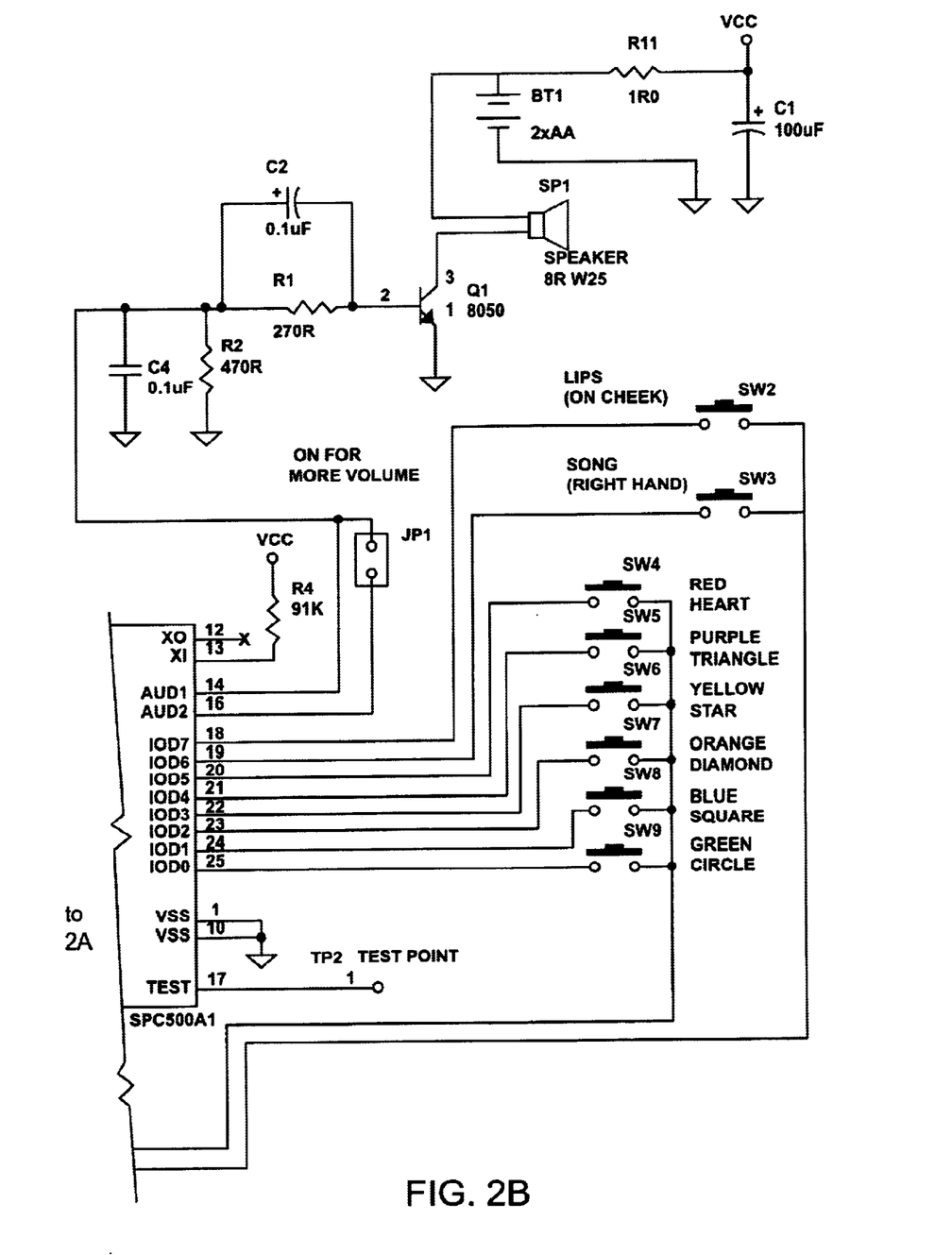

In this embodiment, a pressure sensitive switch is located behind each shape, or function indicia. The switches are connected to switching circuitry, which in turn provides input to a logic circuit. FIG. 2 shows one embodiment of the switch and logic circuitry that activates the plurality of instructional modalities as appropriate for the child's use.

The preprogrammed instruction modalities described above are stored in one or more memory chips in the logic circuit or an associated microprocessor. Different instructional modalities can be activated depending on which indicium is pressed. If no modality is chosen, the toy defaults to a state where the shapes on the toy's bib flash. Activating different programs in memory via switching means, and driving speech chips according to a chosen program are well known by those of ordinary skill in the art.

To begin instructive play, the figure's left hand is squeezed activating the switch behind On/Off indicium 108. The figure gives a pleasant giggle and says, "Hi, I'm Baby Tad. Let's sing!" The toy then begins a song. At the same time, lights associated with each of the six shapes 106 on the frog's bib flash in random sequence. The six shapes are a square, a triangle, a circle, a heart, a star, and a diamond. They are colored yellow, purple, red, orange, blue and green. Of course, the use of these particular colors and shapes is arbitrary and a large number of other colors, shapes, or learning indicia can be used. For example a "polka dot" or "checkered" pattern could be used instead of solid colors. If the child presses a shape that is not flashing, the toy says the color and the name of the shape, for example, "blue square", or "yellow star", or "red heart". The toy then waits for the child to press another shape, or possibly to squeeze the hand with the note symbol on it.

In a second learning modality, if the child presses the flashing shape, the toy says the color and the name of the shape, and then rewards the child with a song. At the end of every song, the shapes on the toy's bib begin to flash. This teaches the child to move his or her hands in response to what was seen. The child also learns depth perception from reaching for the flashing shape, and connects the reward with an auditory signal.

In a third learning modality, if the child presses or squeezes the note indicium 110 on the frog's right hand, one of a number of songs will play. If the child squeezes the right hand note indicium before the first song is finished, the next song will play, so that the toddler learns that she or he can control the sounds made by the toy. At the end of the song, the shapes on the bib will flash to invite the child to press one of them.

A fourth learning modality involves pressing the lip symbol 112 on the frog's cheek, which will cause the frog to make a kissing sound and say, "I love you." This again teaches the child hand-eye coordination and teaches the child to control the actions of the toy, and provides an insight to social skills, relating a kiss on the cheek to fondness.

At the end of play, pressing the On/Off indicium turns off the toy and it says, "Bye, Bye!" If the child doesn't interact with it for several seconds, the toy says, "Pick up Baby Tad." If the child still doesn't respond, the toy will say any of several phrases, such as "Peek-a-boo, I see you" or "Let's play!" If the child doesn't interact with the toy for twenty seconds, the figure turns off automatically, saying, "Bye Bye".

A table listing the logical relationships between indicia activation and toy response can be found in U.S. patent application Ser. No. 09/387,657, filed on Aug. 27, 1999, which is herein incorporated by reference in its entirety.

In the embodiments described above, the indicia on the figure are in the form of shapes. In other embodiments, the indicia may be in the form of letters and/or numbers. These indicia may be at any suitable location on the figure including on the chest, hands, or feet. Preferably, at least some indicia are on the chest so that a child can easily access them. In some embodiments, the letters and/or numbers may form a historically recognized set of indicia such as the sequence A–Z or the sequence 1–9, or 1–10.

In these embodiments, the educational toy may include a declaratory instruction modality that teaches a child the names or sounds associated with the letters or numbers on the figure. For example, the child can press a letter on the figure to hear its name or could press the letter to hear the sound associated with the letter. To reinforce what the child has learned, a second quizzing instruction modality is useful. For example, the educational toy can state the name of a letter without prompting by the child. Then, the toy asks the child to press the correct letter.

Another useful instructional modality for teaching letters is to use a song, such as the traditional "ABC" song. The child learns that the alphabet on the figure is associated with the song being played. Learning can be reinforced if the song automatically stops in the middle of it. Then, the toy can ask the child to press the next letter in the song. If the answer is wrong, the toy can encourage the child to make several more attempts at the correct answer before providing it.

Embodiments of the invention combine the above-described instruction modalities and other modalities to teach children that letters have names and distinct sounds. Further, by using colored letters and numbers, embodiments of the invention reinforce what the child may already know about colors. For example, in one response to a child pressing the letter D on the toy, the toy replies, "Thank you! That's the green letter D that says Duh," thus reinforcing the child's knowledge of color. In response to an incorrect answer, the toy may ask, "Need a clue? The letter is blue. Please press the blue letter M." Thus, the toy uses and reinforces the child's knowledge of colors.

Figure 3:
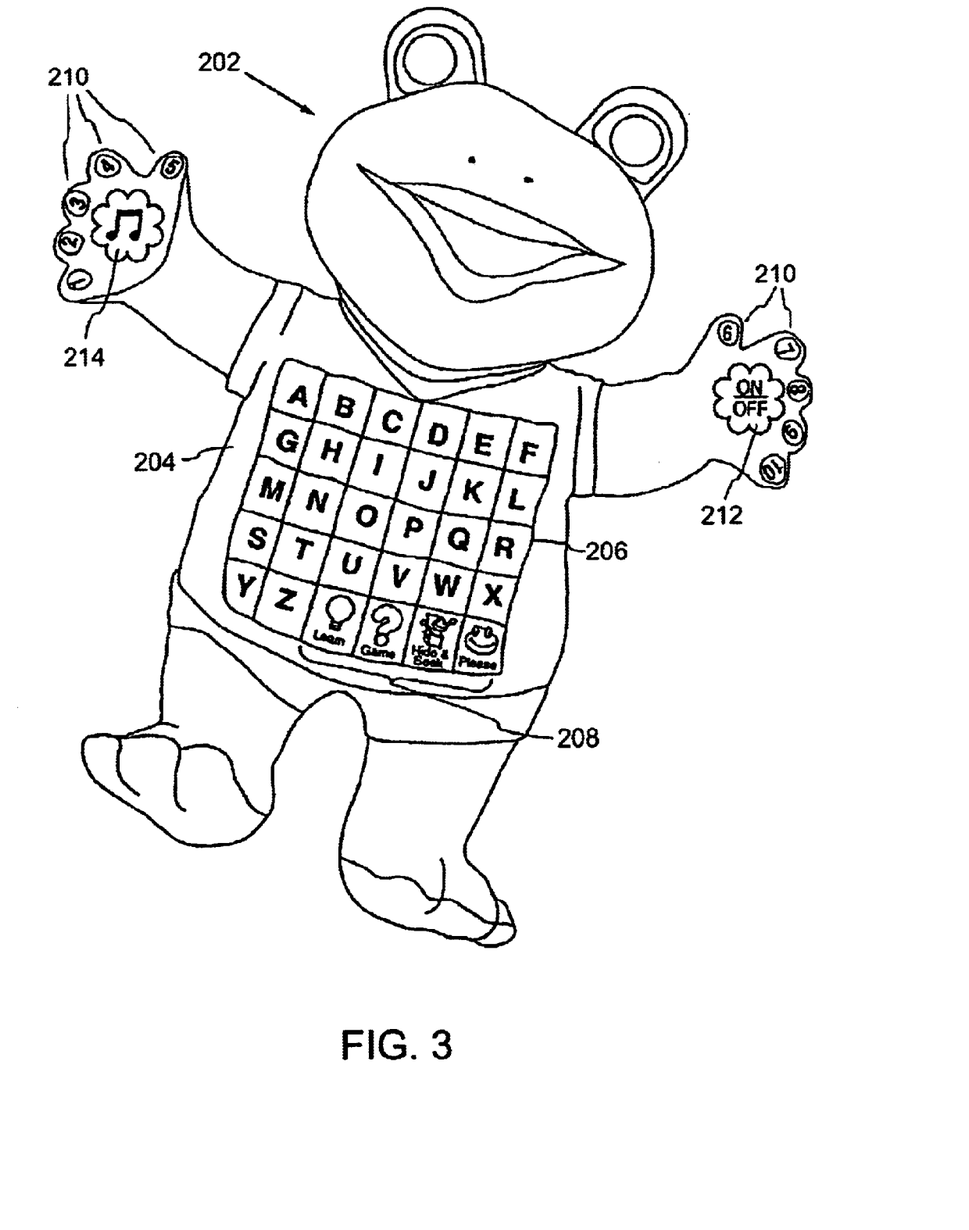
FIG. 3 shows a toy in the form of a plush animal with indicia on its chest and hands.

FIG. 3 shows an educational toy that has letters and numbers on it. The toy in this embodiment is a figure in the form of a plush frog 202. In one embodiment, the frog may be sized about one and a half feet high and a bit over one foot wide. The frog may be named Little Leap after the game of leapfrog. The toy is made from a soft, colorful fabric that is pleasant to touch, and has a cuddly appearance.

The frog 202 has a vest 204 that contains the alphabet. The letters of the alphabet may have different colors. In this embodiment, the letters have four different colors. In the last row, four red squares contain instruction modality indicia 208. The frog's fingers have number indicia on them 210, reminiscent of counting on one's fingers. An On/Off function indicium 212 is on the left palm. A musical indicium 214 in the form of a musical note is located on the right palm.

In this embodiment, a pressure sensitive switch is located behind each letter, number, or function indicia. The switches are connected to switching circuitry, which in turn provides input to a logic circuit.

Preprogrammed instruction modalities are stored in one or more memories in the logic circuit or an associated microprocessor. Different instructional modalities are activated depending on which function indicia are pressed. If no modality is chosen, the toy defaults to the simplest modality.

To begin instructive play, the figure's left hand is squeezed activating the switch behind On/Off indicium 212. The figure gives a pleasant giggle and says, "I'm Little Leap. Let's play! Please press a red square to choose a game." Pressing a function indicium that activates one of the instruction modalities 208 activates the first game. For example, a square with a light bulb on it begins an "explore and learn" instruction modality. The child presses a letter on the figure's vest and the letter's name and the sound (or sounds) it makes is heard. If the numbers on the figure's fingers are pressed, the number's name is pronounced. The child can press the fingers in sequence to hear the figure count in sequence from 1 to 10. If a child forgets to press a red square to select a game, the figure defaults to the "explore and learn" instruction modality.

Pressing a second function indicia 208 activates a second game. A red square with a "?" symbol on it initiates a question type instructional modality, in which the child uses recognition and recall to answer the question. The figure asks the child to find a letter or number. For example, the toy may say, "Please press the letter R." If the child presses the right letter or number, the figure thanks the child. If the child presses the wrong letter or number, the figure tells the child what s/he pressed. For example, the toy may say "That is the letter B that says buh!" This toy also has an instructional modality that teaches manners. If the frog forgets to say "please" before giving his instruction, the child gets to press the "please" indicium to remind the frog of his manners. The figure replies, "Whoops! I forgot to say please. Thanks for the reminder." Any time the child presses the "please" indicium, the figure replies, "It's nice to say please." The figure always says "thank you" in response to a user's effort.

A third learning modality involves giving logic clues to find a number or letter that the toy figure knows, but the child has to figure out. To activate this modality, a third indicium function box is pressed. The toy says, "Find me." The user presses any letter or number to hear a reasoning clue, such as for a number, "I'm bigger than that, and I'm red", or for a letter, "I come before W and I'm blue."

Alternatively, the instruction modality is changed, or the toy may be turned on, by pressing the music indicium 214 on the right hand. The figure will then sing a letter song (e.g., the "ABC" song) or a number song (e.g., "One little, two little, three little Leap Frogs"). When the figure stops singing, the child tries to press the letter or number that comes next. If the child is correct, the figure repeats the name of the letter or number, congratulates the child, and then continues singing. If the wrong letter or number is pressed, the figure corrects the error and urges a second try. Eventually the correct answer is provided and the song continues. If the child does not respond when the song stops, the figure prompts the child to find the next number or letter.

At the end of play, the toy is turned off by pressing the On/Off indicia and the figure says "Night, night!" Otherwise, the figure turns off automatically thirty seconds after giving a few prompts to keep playing. A snoring sound can be produced to let the child know the toy is about to turn off.

A table showing relationships between indicia activation and the toy outputs can be found in U.S. Pat. No. 5,944,533, which is herein incorporated by reference in its entirety.

Figure 4A:
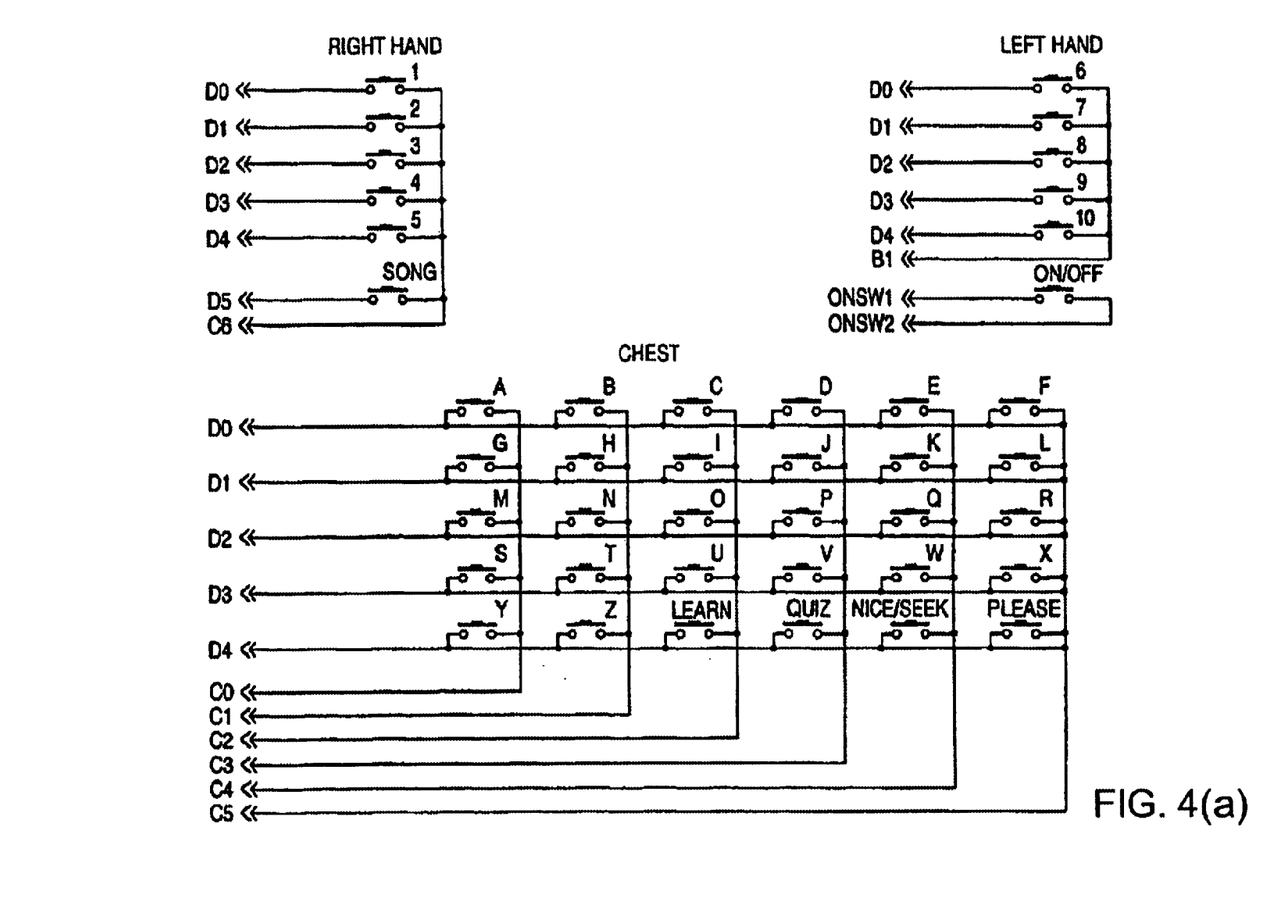
FIG. 4(a) and 4(b) show schematic diagrams of circuitry that can be used in a toy of the type in FIG. 3.
Figure 4B:
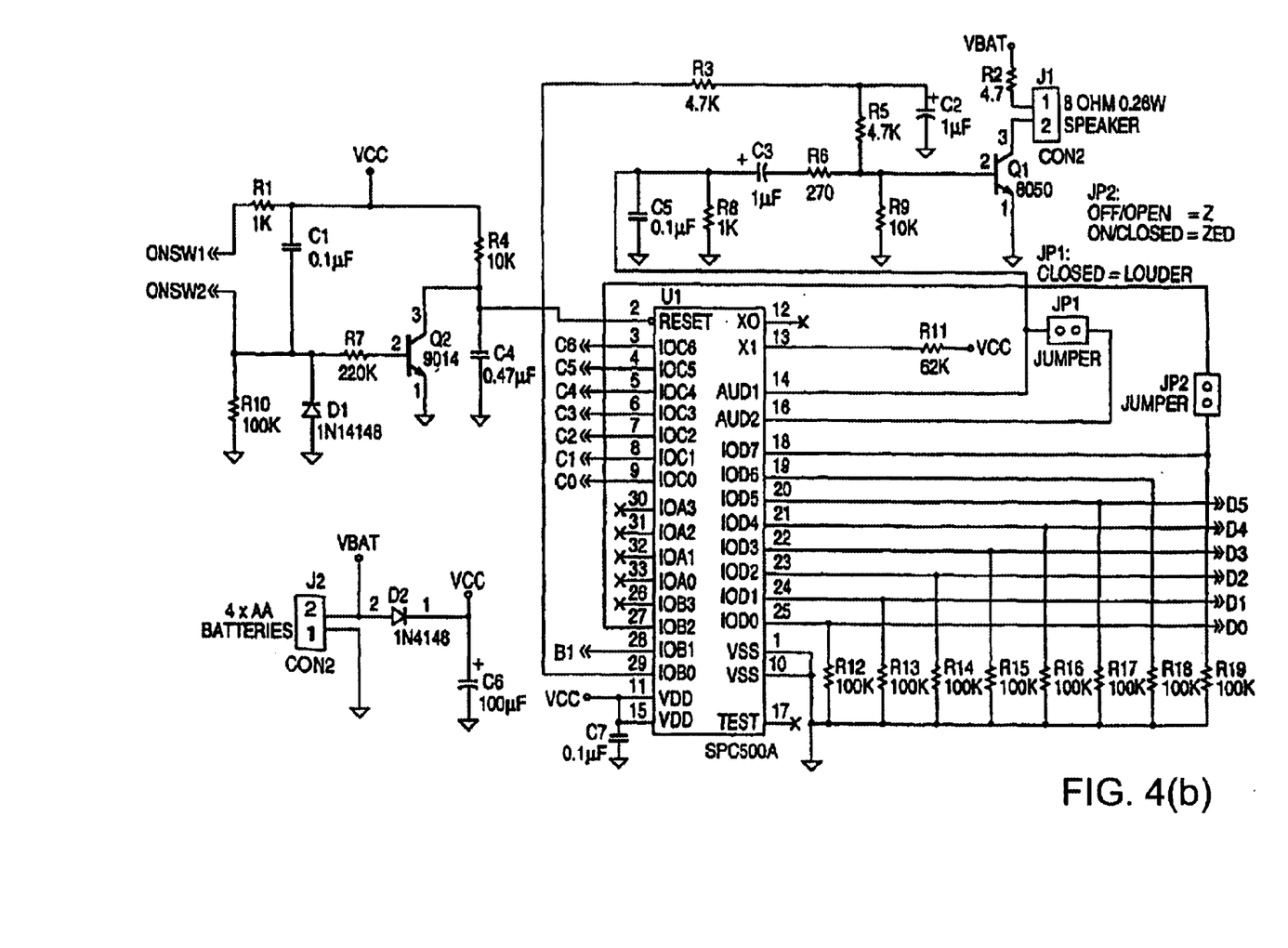

FIG. 4 shows another embodiment of the invention. This embodiment includes an educational toy 300 and a book 302. The book 302 is to be used with the educational toy 302.

The book 302 may include indicia 304 corresponding to indicia 308 on the toy 302. When the user selects a functional indicium 314(a) with an image of a book, the educational toy 300 can be in a book reading mode. After pressing an indicium 308 on the toy 300, the toy 300 can read text on the page that contains the indicia 304. For example, after pressing the letter "A" on the toy 300, the toy 300 can read from the page of the book 302 with the letter "A". In this example, the toy 300 may say, "Anna alligator likes to add." Thus, in embodiments of the invention, the indicia can comprise the letters of the alphabet, and the book 302 has one letter of the alphabet on each page of the book 302. When a letter of the alphabet on the toy 300 is pressed, the educational toy 300 provides an audio interpretation of printed matter on the page with the letter.

In embodiments of the invention, one or more books could be used with the educational toy 300. The audio data for the one or more books may reside within the toy 300 or could be supplied to the toy 300 via external cartridges with audio data in them. In these embodiments, a book and cartridge may come as a set and may be used by the user. Such book/cartridge sets could be purchased at a store and can expand the function of the educational toy 300. A recess (not shown) may be provided in the toy 300 to receive a cartridge (or other transferable information media) containing additional data (e.g., book data) for the toy 300. Any of the toy's responses or outputs can be changed using the cartridge. As will be described in detail below, audio for the books can also be downloaded from a server computer via the Internet, with or without other audio data for the educational toy 300.

The toy 300 includes other function indicia including a quizzing function indicium 314(b), a color function indicium 314(c), and a declaratory function indicium 314(d). An On/Off function indicium 312 may also be on the toy 300 to turn it on or off.

Figure 5:
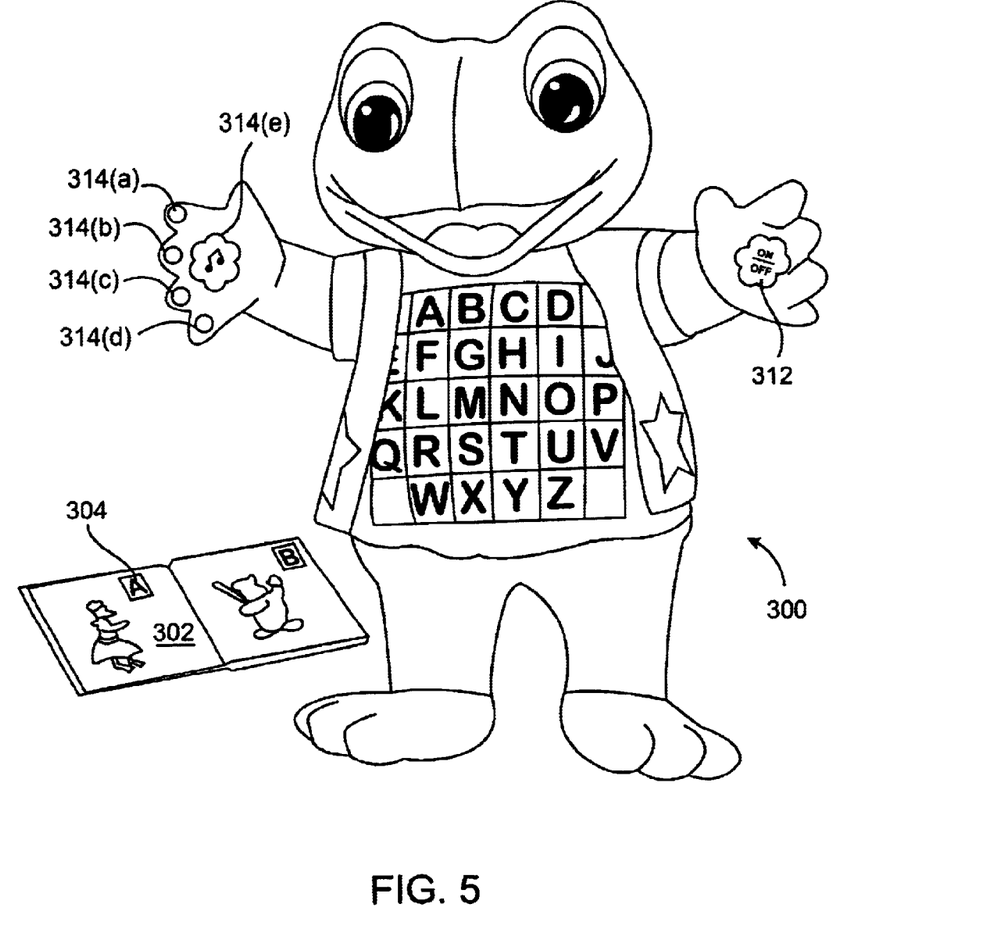
FIG. 5 shows another embodiment of the invention including an educational toy and a book to be used with the educational toy.

FIG. 5 shows a system according to an embodiment of the invention. The system includes a location 10 where the user is present (i.e., a user site). At this location 10, a client computer 20 such as a personal computer can be operatively coupled to a linker device 19. The linker device 19 may be coupled to the client computer 20 through a wireless or a wired link (e.g., a cable). An educational toy 21 may be included in the system and may communicate with the client computer 20 via the linker device 19. The educational toy 21 may be any of the toys described above, or any other suitable toy.

The linker device 19 may be any suitable device capable of transferring data between the client computer 20(a) and the educational toy 21. The linker device 19 could be, for example, a wireless transceiver such as a wireless RF (radio frequency) transceiver or an infrared transceiver. In preferred embodiments, however, the linker device 19 is a device, which is capable of reading information from, and writing information to, the transferable information storage medium (not shown). In a typical embodiment, the transferable information storage medium may be a cartridge, which can be inserted into both the linker device 19 and the interactive appliance 21. Preferably, the transferable information storage medium can be inserted within a recess in many different types of educational toys. For example, the transferable information storage medium may be inserted into a cylindrically shaped educational toy or into an educational toy in the form of a child's laptop computer (as described in the above-referenced provisional applications). A user may thus own many different types of educational toys, while using one linker device and one transferable information storage medium.

The transferable information storage medium may be in any suitable form. For instance, the transferable information storage medium may be a cartridge, a disk, a tape, or a memory stick. Cartridges are especially desirable since they can be easily manipulated and handled by children. Any suitable amount of storage space may be provided on the transferable information storage medium. The information storage medium can contain code for changing outputs provided by the educational toy, where the code is received from a server computer via the Internet.

A server computer 17 including data representing a Web site 16 can be in operative communication with the client computer 20 at the user's site 10. The Web pages of the Web site 16 may include any number of interactive features including any suitable number of hyperlinks to help guide the user through the Web site 16. The Web site 16 may also have a number of graphical user interfaces for the user to input information such as his name, grade, preferences, etc. into the system. A browser on the client computer 20 in communication with the server computer 17 permits the user or others to view the Web site 16 and pages thereof. Examples of suitable browsers include Internet Explorer™, which is commercially available from Microsoft and Netscape Navigator™. Access to the Web site 16, and in particular to the user's information (e.g., profile information), may be restricted by requiring that any visitors enter an identifier (e.g., a password) to show that the persons accessing the information have proper authorization.

The user may contact the Web site 16 to obtain information for use in the educational toy 21. The content may be in the form of new audio data for the toy, or new instruction modalities. Typically, the new content for the toy is in the form of a "content package" which may be downloaded by the user (or the user's parent).

Figure 6:
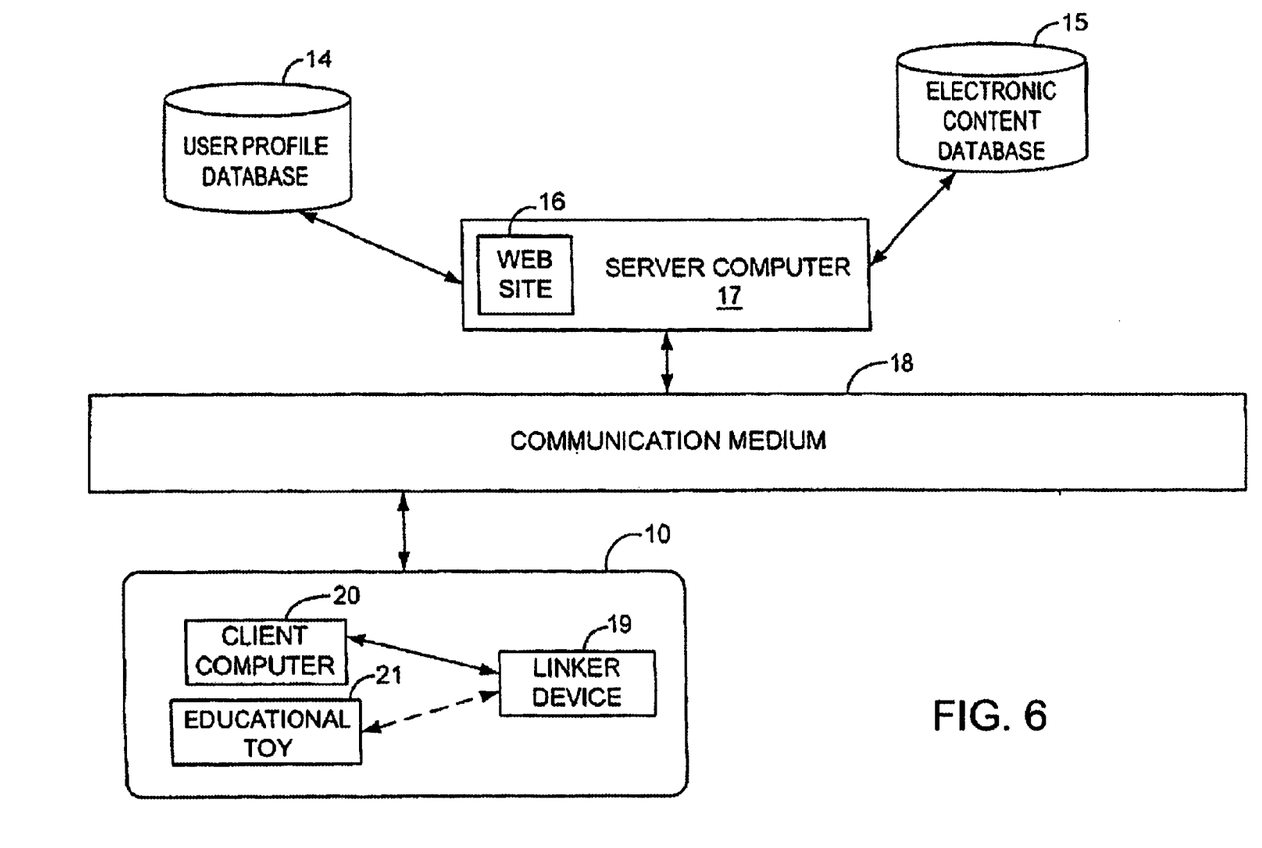
FIG. 6 shows a system according to an embodiment of the invention.

The server computer 17 is typically a powerful computer or cluster of computers. For example, the server computer 17 can be a large mainframe, a minicomputer cluster, or a group of servers functioning as a unit. In one example, the server computer may be a database server coupled to a Web server. Moreover, the server computer 17 can behave as a single computer, which services the requests of one or more client computers. Client computers, such as the client computer 20 shown in FIG. 6 can communicate with the server computer 17 through the Internet and optionally through one or more Internet Service Providers (ISPs) (not shown). The client computer 20 typically has less memory and less computing power than the server computer 17.

The server computer 17 may have access to one or more databases. As shown in FIG. 1, the server computer 17 may have access to a user profile database 14 and/or an electronic content database 15. Although the databases are shown as being distinct entities, they may be combined in some instances. The user profile database 14 may include the user information. Exemplary user profile information may include information such the user's age, preferences, hobbies, address, phone number, e-mail address, school, favorite subjects, relatives, teachers, favorite songs, favorite sports, favorite foods, favorite cartoons, etc.

The electronic content database 15 may include any suitable content, which can be included in the content package. The content may be in the form of static information, dynamic information, sound files, etc. The content may include problems (e.g., questions, puzzles, riddles, quizzes), as well as songs, games, hints, music, facts, greetings, and messages (e.g., help, encouragement, or error messages).

The system, and especially the server computer 17, can include one or more computer programs, written in any suitable computer language. For example, first, second, and third computer programs used for performing three different functions can be embodied in a single computer program having one or more subroutines, or may be embodied by three separate and distinct computer programs. In embodiments of the invention, for instance, the server computer 17 may have one or more computer programs to: update a user profile in a user profile database, retrieve data from any suitable database, and send data to any person. One or more computer programs may also be provided to select content for and assemble a content package for the user, and send the content package to the user. The server computer 17 and the client computer 20 communicate through a communication medium such as the Internet, and more particularly the World Wide Web (WWW). Typical communication protocols include HTTP (hypertext transfer protocol) and TCP/IP (terminal communication protocol/internet protocol).

By working together, the server computer 17 and the educational toy 21 can provide a greater variety of content to the user than would otherwise be the case. For instance, in embodiments of the invention, thousands of words and phrases can be present on the electronic content database 15 and can be available for use in content packages. Such vast access to content is not available to conventional toys. Moreover, the content in the content database 15 can be easily updated or supplemented by a host entity.

The illustrative embodiments are not intended to limit the scope of the invention. Various modifications, alternative constructions and equivalents may be employed without departing from the scope of the appended claims. Moreover one of more features of any embodiment may be combined with any other feature of any other embodiment in any manner without departing from the scope of the present invention.

What is claimed is:

1. An educational toy comprising:
    (a) a figure having an exterior surface, and wherein the figure has a head and a chest;
    (b) at least one indicium on the chest of the figure;
    (c) switching circuitry coupled to the at least one indicium;
    (d) a sound synthesizer;
    (e) a speaker;
    (f) a memory;
    (g) a plurality of preprogrammed instruction modalities in the memory, wherein the plurality of preprogrammed instruction modalities comprises a first preprogrammed instruction modality that comprises quizzing and a second preprogrammed instruction modality comprising declaratory instruction; and
    (h) a logic circuit having a microprocessor, input terminals that are electrically coupled to the switching circuitry, and output terminals electrically coupled to the sound synthesizer and the speaker,
    wherein the logic circuit controls interaction between the switching circuitry and the plurality of preprogrammed instruction modalities.

2. The educational toy of claim 1 wherein the at least one indicium comprises the letters A–Z.

3. The educational toy of claim 1 wherein the at least one indicium comprises the numbers 1–9.

4. The educational toy of claim 1 wherein the at least one indicium comprises the letters A–Z and wherein the letters A–Z comprise at least three different colors.

5. The educational toy of claim 1 further comprising a third preprogrammed instruction modality that comprises songs.

6. The educational toy of claim 1 wherein the figure comprises hands, and the at least one indicium comprises letters on the chest and numbers on the hands.

7. The educational toy of claim 1 wherein the figure includes a recess for receiving a transferable information storage medium that is received in the recess.

8. The toy of claim 1 wherein the toy comprises a plurality of lights on the chest.

9. The toy of claim 1 wherein the figure is plush.

10. The toy of claim 1 wherein the figure is in the form of an animal.

11. The toy of claim 1 wherein the first preprogrammed instruction modality includes asking a child to find a letter.

12. The toy of claim 1 wherein the second preprogrammed instruction modality includes telling a child a name of a letter.

13. A system comprising:
    (a) an educational toy comprising:
        i) a figure having an exterior surface, and wherein the figure has a chest, hands and feet,
        ii) indicia on the chest of the figure,
        iii) switching circuitry coupled to the indicia,
        iv) a sound synthesizer,
        v) a speaker,
        vi) a memory,
        vii) a plurality of preprogrammed instruction modalities in the memory, wherein the plurality of preprogrammed instruction modalities comprises a first preprogrammed instruction modality that comprises quizzing and a second preprogrammed instruction a modality, and
        viii) a logic circuit having a microprocessor, input terminals that are electrically coupled to the switching circuitry, and output terminals electrically coupled to the sound synthesizer and the speaker,
        wherein the logic circuit controls interaction between the switching circuitry and the plurality of preprogrammed instruction modalities, and
        ix) a recess; and
    (b) a transferable information storage medium that is insertable in the recess.

14. The system of claim 13 further comprising a linker device that is adapted to receive the transferable information storage medium.

15. The system of claim 14 further comprising a book that is to be used with the educational toy.

16. The system of claim 14 wherein pages in the book have indicia corresponding to the indicia on the figure.

17. The system of claim 14 wherein the indicia comprise the letters of the alphabet, and wherein the book has one letter of the alphabet on, each page of the book, and wherein when a letter of the alphabet on the figure is pressed, the educational toy provides an audio interpretation of printed matter on the page with the letter.

18. A system comprising:
    (a) an educational toy comprising:
        i) a figure having an exterior surface,
        ii) indicia on the exterior surface of the figure,
        iii) switching circuitry coupled to the indicia,
        iv) a sound synthesizer,
        v) a speaker,
        vi) a memory,
        vii) a plurality of preprogrammed instruction modalities in the memory, wherein the plurality of preprogrammed instruction modalities comprises a first preprogrammed instruction modality that comprises quizzing and a second preprogrammed instruction modality, and
        viii) a logic circuit having a microprocessor, input terminals that are electrically coupled to the switching circuitry, and output terminals electrically coupled to the sound synthesizer and the speaker,
        wherein the logic circuit controls interaction between the switching circuitry and the plurality of preprogrammed instruction modalities; and
    (b) an information storage medium containing code for changing outputs provided by the toy, wherein the code is received from a server computer via the Internet.

19. The system of claim 18 wherein the figure is plush.

20. The system of claim 18 wherein the figure is in the form of an animal with hands and feet and is plush.

21. The system of claim 18 wherein the information storage medium is a cartridge.

22. The system of claim 18 further comprising:
    a linker device adapted to receive the information storage medium.

23. The system of claim 18 further comprising a book to be used with the educational toy.

24. The system of claim 18 further comprising a book to be used with the educational toy and a linker device adapted to receive the information storage medium.

25. An educational toy comprising:
    (a) a figure having an exterior surface, and wherein the figure has a head and a chest;
    (b) at least one indicium on the chest of the figure;
    (c) a sound synthesizer;
    (d) a speaker;
    (e) a memory;
    (f) a plurality of preprogrammed instruction modalities in the memory, wherein the plurality of preprogrammed instruction modalities comprises a first preprogrammed instruction modality that comprises quizzing and a second preprogrammed instruction modality comprising declaratory instruction; and
    (g) a logic circuit having a microprocessor electrically coupled to the at least one indicium, and output terminals electrically coupled to the sound synthesizer and the speaker.

26. The toy of claim 25 wherein the first preprogrammed instruction modality includes asking a child to find a letter.

27. The toy of claim 25 wherein the at least one indicium comprises a circle.

28. The toy of claim 25 wherein the second preprogrammed instruction modality teaches a child the names of letters and their sounds.

29. The toy of claim 25 further comprising lights on the chest.

30. An educational toy comprising:
    (a) a figure having an exterior surface, and wherein the figure has a head and a chest;
    (b) at least one indicium on the chest of the figure;
    (c) a sound synthesizer;
    (d) a speaker;
    (e) a memory;
    (f) a plurality of preprogrammed instruction modalities in the memory, wherein the plurality of preprogrammed instruction modalities comprises a first preprogrammed instruction modality that comprises quizzing and a second preprogrammed instruction modality comprising a song; and (g) a logic circuit having a microprocessor electrically coupled to the at least one indicium, and output terminals electrically coupled to the sound synthesizer and the speaker.

31. The toy of claim 30 wherein the first preprogrammed instruction modality includes asking a child to find a letter.

32. The toy of claim 30 wherein the at least one indicium comprises a circle.

33. The toy of claim 30 further comprising a third preprogrammed modality in the memory comprising a game.

34. The toy of claim 30 wherein the at least one indicium comprises a circle.

35. The toy of claim 30 further comprising lights on the chest.

* * * * *